(12) United States Patent
Yasaki

(10) Patent No.: US 9,699,327 B2
(45) Date of Patent: Jul. 4, 2017

(54) IMAGE READING APPARATUS CAPABLE OF DETERMINING READING POSITION LESS AFFECTED BY FOREIGN MATTER

(71) Applicant: CANON KABUSHIKI KAISHA, Tokyo (JP)

(72) Inventor: Kosuke Yasaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/046,846

(22) Filed: Feb. 18, 2016

(65) Prior Publication Data

US 2016/0248918 A1 Aug. 25, 2016

(30) Foreign Application Priority Data

Feb. 23, 2015 (JP) ................................. 2015-032774

(51) Int. Cl.
*H04N 1/00* (2006.01)
*H04N 1/10* (2006.01)
*H04N 1/40* (2006.01)

(52) U.S. Cl.
CPC ..... *H04N 1/00037* (2013.01); *H04N 1/00013* (2013.01); *H04N 1/0032* (2013.01); *H04N 1/0057* (2013.01); *H04N 1/00092* (2013.01); *H04N 1/1061* (2013.01); *H04N 1/40* (2013.01)

(58) Field of Classification Search
CPC ........................ H04N 1/00037; H04N 1/00013
See application file for complete search history.

(56) References Cited

U.S. PATENT DOCUMENTS

| 6,563,938 | B1 | 5/2003 | Harada | |
| 6,792,161 | B1* | 9/2004 | Imaizumi | G01N 21/94 356/237.1 |
| 7,782,503 | B2* | 8/2010 | Ishido | H04N 1/00013 358/463 |
| 2002/0176634 | A1* | 11/2002 | Ohashi | H04N 1/00795 382/275 |
| 2003/0076518 | A1* | 4/2003 | Miyake | H04N 1/00002 358/1.9 |
| 2005/0068450 | A1* | 3/2005 | Steinberg | G06K 9/346 348/335 |

(Continued)

FOREIGN PATENT DOCUMENTS

JP 2004179818 A 6/2004

*Primary Examiner* — Saeid Ebrahimi Dehkord
(74) *Attorney, Agent, or Firm* — Rossi, Kimms & McDowell LLP

(57) ABSTRACT

An image reading apparatus that can, even when foreign matter exists on an original platen glass, determine a position less affected by the foreign matter, as an image reading position. In the image reading apparatus, an original is conveyed to a reading area on the original platen glass, and a reading unit reads the original at a reading position within the reading area. Image data is read at a plurality of candidate reading positions within the reading area in a state where the original is not conveyed, and foreign matter adhering to the candidate reading positions is detected. The number of pieces and the size of each piece of the detected foreign matter are measured, and a reading position for reading the original is determined from the plurality of candidate reading positions using a result of the measurement.

7 Claims, 17 Drawing Sheets

(56) References Cited

U.S. PATENT DOCUMENTS

| | | | | |
|---|---|---|---|---|
| 2005/0280867 A1* | 12/2005 | Arai | ............... | H04N 1/00013 |
| | | | | 358/2.1 |
| 2010/0315691 A1* | 12/2010 | Nishio | ............. | G03G 15/607 |
| | | | | 358/475 |
| 2011/0242628 A1* | 10/2011 | Morikawa | ............ | H04N 1/12 |
| | | | | 358/504 |
| 2014/0268256 A1* | 9/2014 | Mayama | ............ | H04N 1/024 |
| | | | | 358/496 |
| 2015/0055157 A1* | 2/2015 | Hamano | ......... | H04N 1/00037 |
| | | | | 358/1.12 |
| 2016/0191738 A1* | 6/2016 | Nakamura | ...... | H04N 1/00803 |
| | | | | 358/1.12 |

* cited by examiner

| READING POSITION | DUST NOT SMALLER IN WIDTH THAN PREDETERMINED WIDTH |
|---|---|
| Y | 0 |
| Y' | 1 |

| READING POSITION | NUMBER $D_L$ OF PIECES OF DUST NOT SMALLER IN WIDTH THAN PREDETERMINED WIDTH | NUMBER $D_S$ OF PIECES OF DUST SMALLER IN WIDTH THAN PREDETERMINED WIDTH |
|---|---|---|
| Y | 0 | 3 |
| Y' | 1 | 1 |

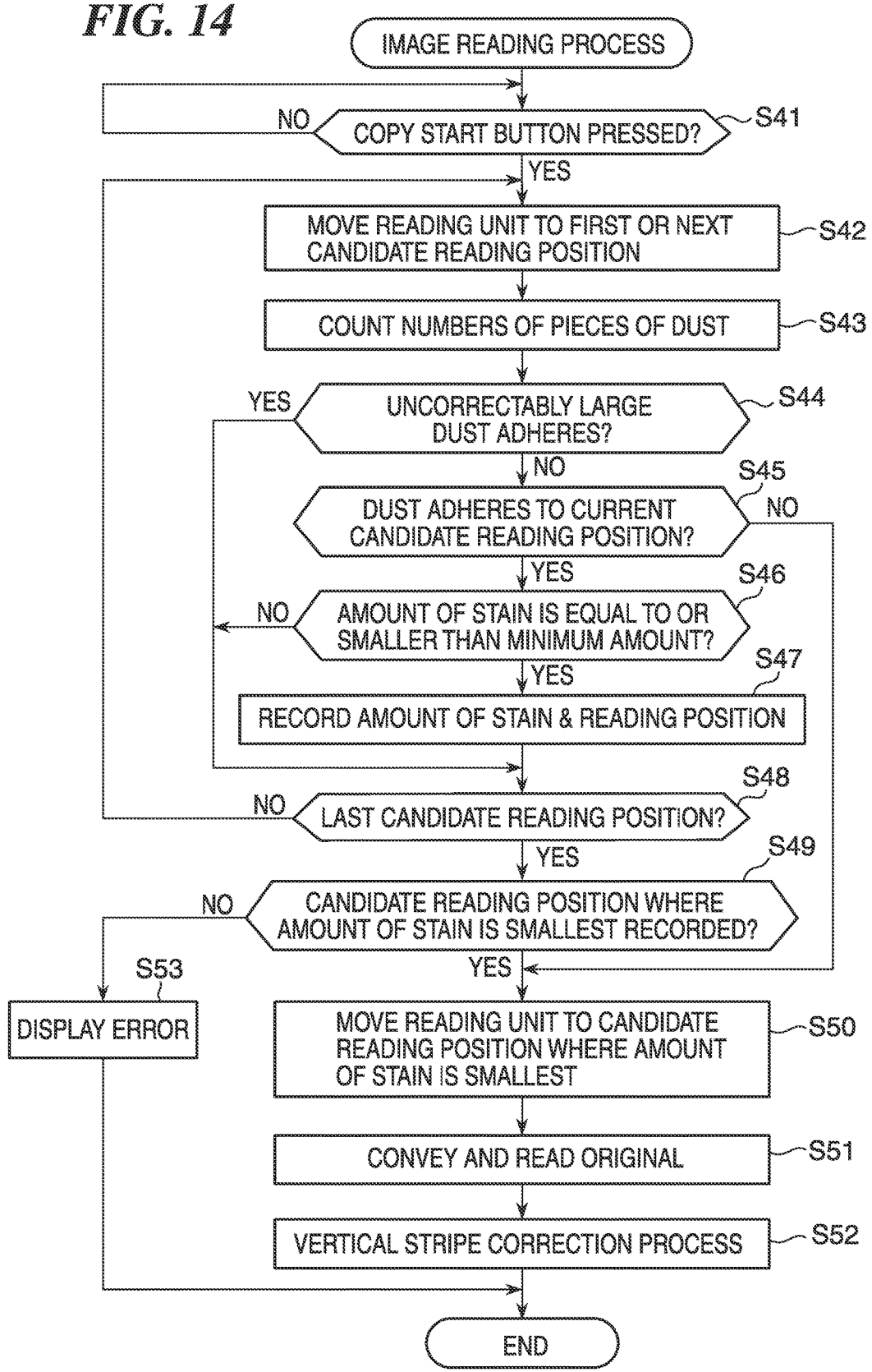

| CANDIDATE READING POSITION | NUMBER $D_L$ OF PIECES OF DUST NOT SMALLER IN WIDTH THAN PREDETERMINED WIDTH | NUMBER $D_S$ OF PIECES OF DUST SMALLER IN WIDTH THAN PREDETERMINED WIDTH | NUMBER OF UNCORRECTABLY LARGE PIECES OF DUST |
|---|---|---|---|
| $Y_1$ | 0 | 3 | 0 |
| $Y_2$ | 1 | 1 | 0 |
| $Y_3$ | 1 | 0 | 1 |

IMAGE READING APPARATUS CAPABLE OF DETERMINING READING POSITION LESS AFFECTED BY FOREIGN MATTER

BACKGROUND OF THE INVENTION

Field of the Invention

The present invention relates to an image reading apparatus equipped with a reading position-determining unit that determines a reading position for an original.

Description of the Related Art

Conventionally, an image reading apparatus is known which performs reading of an original in a moving original reading mode, more specifically, conveys originals placed on a document tray using an automatic document feeder (ADF) one by one, and reads an image from each original by irradiating the original at a reading position with light emitted from a light source, and causing reflected light from the original to enter an image pickup device, such as a CCD sensor.

In an image reading apparatus equipped with the ADF, dust sometimes adheres to a portion of the original platen glass at the reading position due to paper dust of a conveyed original itself or a toner flake coming off toner printed on the original. Assuming that an original is read in the moving original reading mode in a state in which dust, such as paper dust or toner flake, adheres to the original platen glass, light emitted toward a surface of the original is blocked by the dust, which causes a vertical stripe to be formed in a read image at a position corresponding to a position of the original platen glass where the dust adheres. Therefore, in the image reading apparatus that reads an image from an original while conveying the original, it is desirable to determine a position on the original platen glass, where no dust adheres, as the original reading position, and then perform reading of the original.

As the image reading apparatus equipped with the reading position-determining unit, there has been proposed a technique in which the presence or absence of dust on an image read at a predetermined reading position is detected in a reading position setting mode, and when it is determined that dust is present, the reading position is changed to thereby detect the presence or absence of dust again (see Japanese Patent Laid-Open Publication No. 2004-179818 and U.S. Pat. No. 6,563,938). Then, if it is determined form the image read at the changed reading position that no dust is present, reading of an image from an original is performed at the changed reading position.

However, the above-described conventional technique is configured to determine a position on the original platen glass, where no dust adheres, as the reading position, and hence in a case where dust is present at each of a plurality of possible reading positions, it can occur that it is impossible to perform reading of an image.

SUMMARY OF THE INVENTION

It is an object of the present invention to provide an image reading apparatus that is, even when foreign matter such as dust is present on an original platen glass, capable of determining a position less affected by the foreign matter, as a reading position for reading an image.

In a first aspect of the invention, there is provided an image reading apparatus comprising a conveying unit configured to convey an original to a reading area on an original platen glass, a reading unit configured to read the original at a reading position within the reading area, a detection unit configured to detect, using image data read at a plurality of candidate reading positions within the reading area in a state where the original is not conveyed, foreign matter adhering to the plurality of candidate reading positions, a measurement unit configured to measure the number of pieces of foreign matter detected by the detection unit and a size of each piece of the foreign matter, and a determination unit configured to determine a reading position at which the original is to be read, out of the plurality of candidate reading positions, using a result of measurement by the measurement unit.

According to the present invention, the detection unit detects foreign matter adhering to a plurality of candidate reading positions, and a measurement unit measures the number of detected pieces of foreign matter and a size of each detected piece of the foreign matter. Then, a determination unit determines a reading position at which the original is to be read, out of the plurality of candidate reading positions, using a result of the measurement. Therefore, it is possible to read an image with less vertical stripes caused by foreign matter.

Further features of the present invention will become apparent from the following description of exemplary embodiments (with reference to the attached drawings).

BRIEF DESCRIPTION OF THE DRAWINGS

FIG. 14 is a flowchart of an image reading process performed in a third embodiment.

DESCRIPTION OF THE EMBODIMENTS

The present invention will now be described in detail below with reference to the accompanying drawings showing embodiments thereof.

Figure 1:
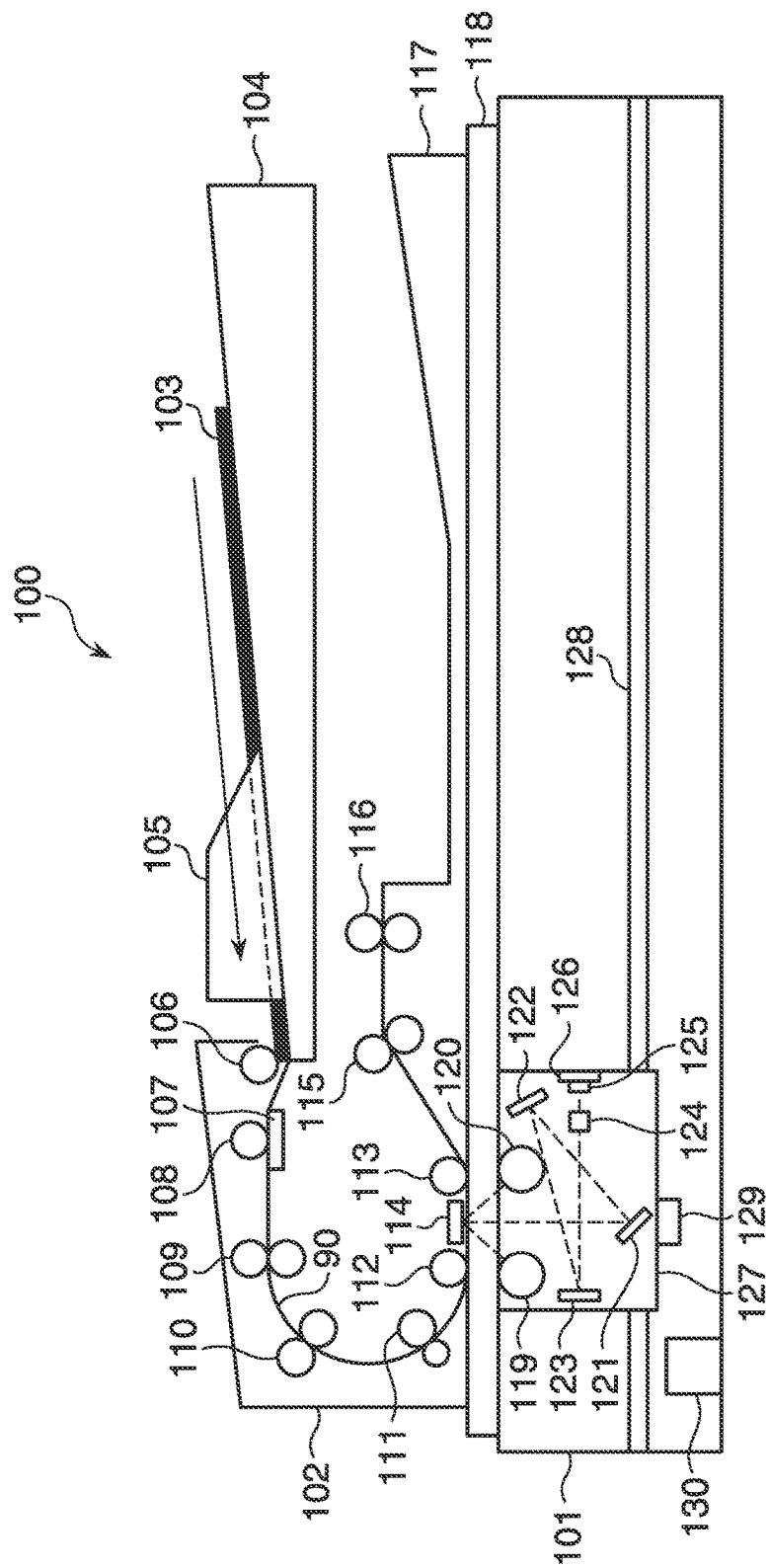
FIG. 1 is a schematic cross-sectional diagram of an image reading apparatus according to a first embodiment.

FIG. 1 is a schematic cross-sectional diagram of an image reading apparatus according to a first embodiment.

Referring to FIG. 1, the image reading apparatus, denoted by reference numeral 100, is mainly comprised of a document reader unit 101 that reads an original, and an ADF (Automatic Document Feeder) 102 that conveys an original to a reading position of the document reader unit 101.

The ADF 102 includes a document tray 104, a pickup roller 106 provided on an upper portion of an end of the document tray 104 in a sheet feeding direction, a curved conveying path 90 as a conveying path for conveying an original (a sheet of a document), and a output tray 117.

The document tray 104 is provided with width regulating plates 105 for regulating the position of an original in a width direction. An original bundle (bundle of sheets of a document) 103 is placed on a document placement surface of the document tray 104, and the original bundle 103 has two sides thereof along a conveying direction regulated by the width regulating plates 105, which suppresses the skew conveying of each original.

The conveying path 90 has an entry port provided with a separation section formed by a separation roller 108 and a separation pad 107. The original bundle 103 is conveyed to the separation section by the pickup roller 106. At the separation section, the separation pad 107 and the separation roller 108 separate the originals of the original bundle 103, one by one, starting with the uppermost original of the original bundle 103.

A first registration roller 109, a second registration roller 110, a first conveying roller 111, a second conveying roller 112, a third conveying roller 113, a fourth conveying roller 115, and a discharge roller 116 are provided in the conveying path 90 at respective locations downstream of the separation roller 108. A reading position for reading an image is between the second conveying roller 112 and the third conveying roller 113, and a white opposed member 114 is provided at a location opposed to the reading position. An original separated by the separation roller 108 is corrected with respect to skew conveying thereof by the first registration roller 109, and then conveyed toward the output tray 117 via the second registration roller 110, the first conveying roller 111, the second conveying roller 112, and the third conveying roller 113.

The original is read by a reading unit, referred to hereinafter, at the reading position between the second conveying roller 112 and the third conveying roller 113. The original having passed the third conveying roller 113 is then discharged onto the output tray 117 via the fourth conveying roller 115 and the discharge roller 116.

The document reader unit 101 is arranged below the ADF 102, and includes an original platen glass 118 opposed to the white opposed member 114 of the ADF 102. The reading unit, denoted by reference numeral 127, is disposed at a location opposed to the white opposed member 114 with the original platen glass 118 interposed therebetween. The reading unit 127 is movable, and includes light sources 119 and 120, reflecting mirrors 121 to 123, an imaging lens 124, line sensors 125, and a signal processing board 126.

The reading unit 127 irradiates an original passing the reading position set to a position within a reading area on the original platen glass opposed to the white opposed member 114 with light from the light sources 119 and 120, and guides the reflected light to the imaging lens 124 via the reflecting mirrors 121 to 123. The light converged to the imaging lens 124 is formed into an image on the line sensors 125 each formed by image pickup elements, such as CCDs, arranged in a line. An optical signal of the image is converted to electric signals by the line sensors 125, and the electric signals are converted to digital signals and then subjected to image processing by the signal processing board 126. Although the reading unit 127 functions as a moving original reading unit at this time, the reading unit 127 can also function as a fixed original reading unit configured to read an original in a state in which the original is stopped within the reading area.

Figure 2:
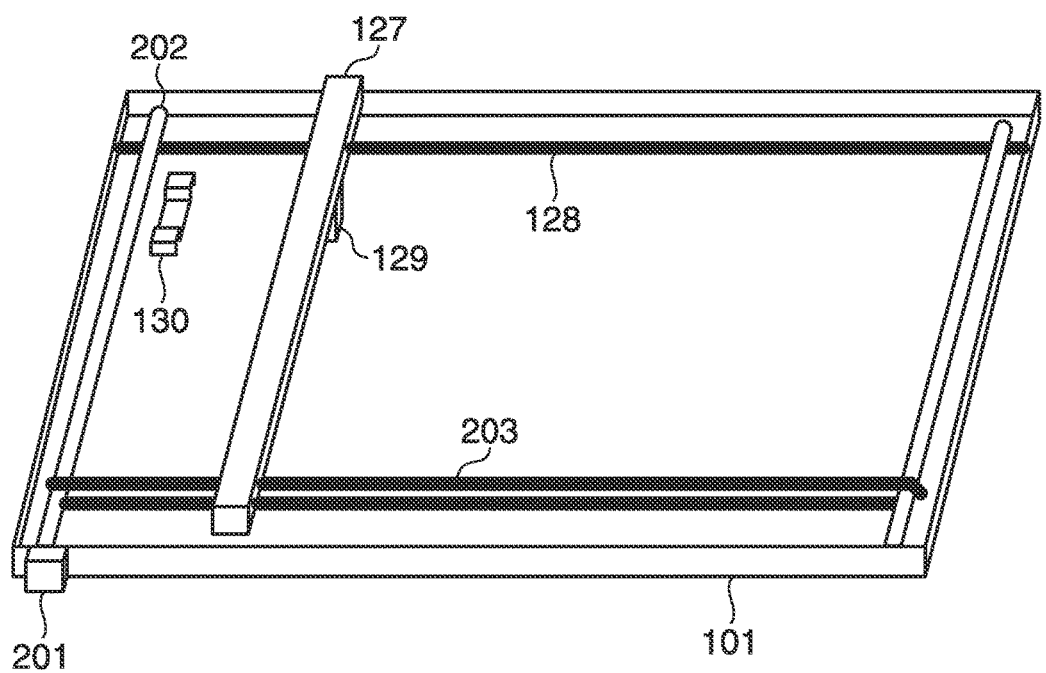
FIG. 2 is a schematic diagram of the inside of a document reader unit of the image reading apparatus shown in FIG. 1.

FIG. 2 is a schematic diagram of the inside of the document reader unit 101 of the image reading apparatus shown in FIG. 1.

Referring to FIG. 2, the document reader unit 101 includes the reading unit 127, a rail 128 that movably supports the reading unit 127, a belt 203 to which one end of the reading unit 127 is fixed, a rotating shaft 202, and a motor 201 that drives the rotating shaft 202. The reading unit 127 has a protrusion 129 formed on a bottom surface thereof. A flag sensor 130 for detecting the protrusion 129 is disposed at a particular position below the protrusion 129. The flag sensor 130 detects a position of the reading unit 127 by detecting the protrusion 129.

When the motor 201 is driven, the rotational force of the motor 201 is transmitted to the rotating shaft 202, whereby the rotating shaft 202 is rotated. When the rotating shaft 202 is rotated, the belt 203 engaged with the rotating shaft 202 is rotated clockwise or counterclockwise as viewed in FIG. 2 in accordance with the rotational direction of the rotating shaft 202. The reading unit 127 fixed to the belt 203 is moved to the left or right as viewed in FIG. 2 in a manner interlocked with the rotation of the belt 203.

The protrusion 129 on the bottom surface of the reading unit 127 is moved in accordance with the movement of the reading unit 127, and when it passes a position opposed to the flag sensor 130, the flag sensor 130 detects the reading unit 127 to generate a pulse signal. As a consequence, it is detected based on the generated signal that the reading unit 127 has passed the position opposed to the flag sensor 130. The position of the reading unit, detected by the flag sensor 130, is set to a reference position of the reading unit 127. The reference position is used as a position with reference to which the position of the reading unit 127 is controlled. That is, it is possible to determine a relative position of the reading unit 127 with respect to the reference position by counting the pulse number of drive pulses output from the motor 201 from a time point at which the reading unit 127 has passed the position opposed to the flag sensor 130. This makes it possible to determine the position of the reading unit 127 even when the reading unit 127 is moving.

Figure 3:
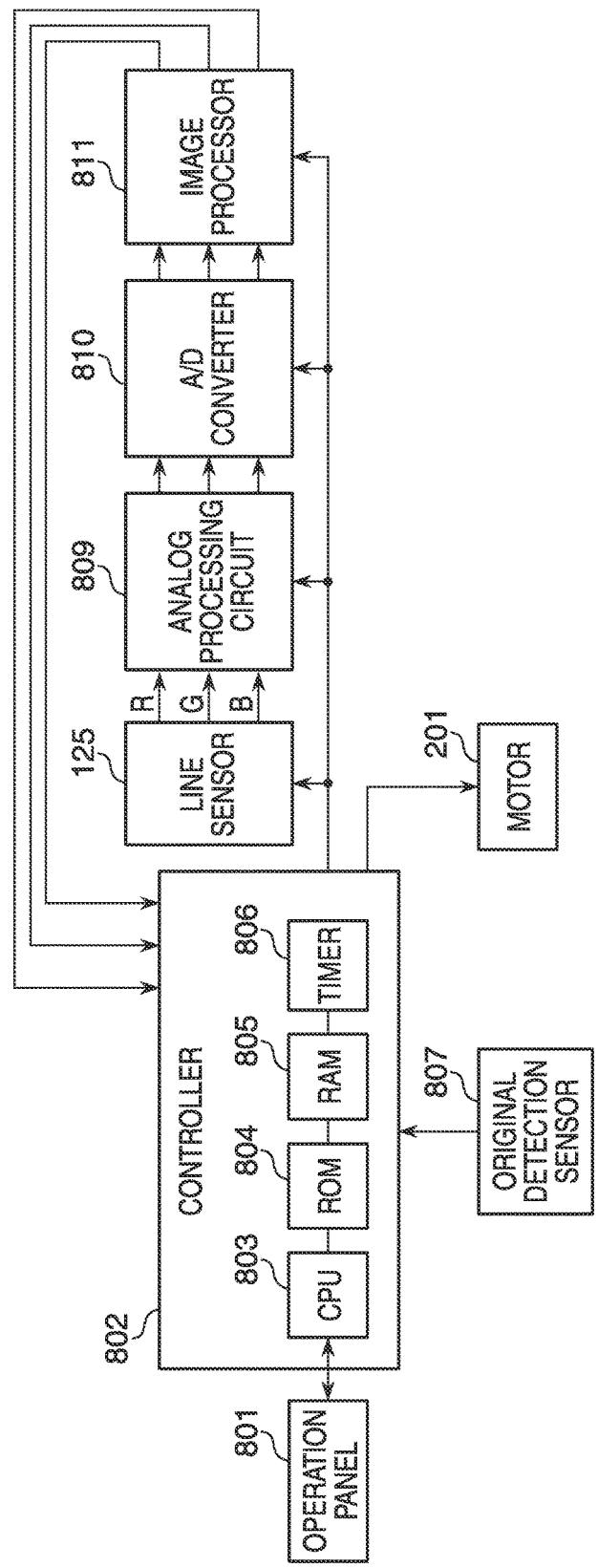
FIG. 3 is a block diagram of a control system of the image reading apparatus.

FIG. 3 is a block diagram of a control system 800 of the image reading apparatus shown in FIG. 1.

The control system 800 of the image reading apparatus 100 includes a controller 802. Referring to FIG. 3, the controller 802 includes a CPU 803, a ROM 804, a RAM 805, and a timer 806. The CPU 803 is connected to the ROM 804, the RAM 805, and the timer 806. The CPU 803 of the controller 802 is connected to an operation panel 801, and the controller 802 is connected to an original detection sensor 807 and the motor 201.

The controller 802 is communicably connected to the line sensors 125, an analog processing circuit 809, an A/D converter 810, and an image processor 811. Further, each line sensor 125 and the analog processing circuit 809, the analog processing circuit 809 and the A/D converter 810, and the A/D converter 810 and the image processor 811 are communicably connected to each other individually in respective pairs.

The CPU 803 performs various control including control for controlling the start and termination of conveyance of originals, and control for driving each drive section of the image reading apparatus 100. The operation panel 801 displays an operation screen operated mainly by a user for setting the number of copies of a document and the start of copying. The ROM 804 stores data specific to each operation section, and stores adjustment values necessary for processing, such as conveyance of originals and image processing. The RAM 805 is used as a storage unit for temporarily storing data for calculation mainly when performing image processing and conveyance of originals.

The timer 806 is a time counter used for measuring a time period required to perform each control operation, determining a time to start a control operation, and generating an interrupt signal. Each line sensor 125 is for reading an image from an original, and is formed, as mentioned hereinbefore, by image pickup elements, such as CCDs, which are arranged in a line in a direction orthogonal to a direction of conveying an original in a moving original reading mode. In the image reading apparatus that reads a color image, the line sensors 125 of respective three colors are disposed e.g. in parallel with each other, and receive incident light in a manner decomposing the same into the colors of R, G, and B by color filters provided on respective front sides thereof. The received light is thus converted to electronic signals by photoelectric conversion, and the electronic signals are input to the analog processing circuit 809 as analog signals.

The analog signals adjusted by the analog processing circuit 809 are converted to digital data by the A/D converter 810, and are then sent to the image processor 811, wherein image processing is performed on the digital data. The image processor 811 processes the digital data with respect to each pixel of the line sensor 125 such that luminance does not vary between pixels when an object having the same density is read by the pixels. More specifically, the image processor 811 reads the white opposed member 114 (see FIG. 1) of which density is controlled to be uniform, and thereby performs adjustment of shading correction such that luminance data obtained by reading an object having the same density indicates the same luminance value, in advance. The image processor 811 applies adjusted shading correction to the digital data to output the corrected data as image data.

The following description will be given of an image reading process using the image reading apparatus 100 shown in FIG. 1.

Figure 4:
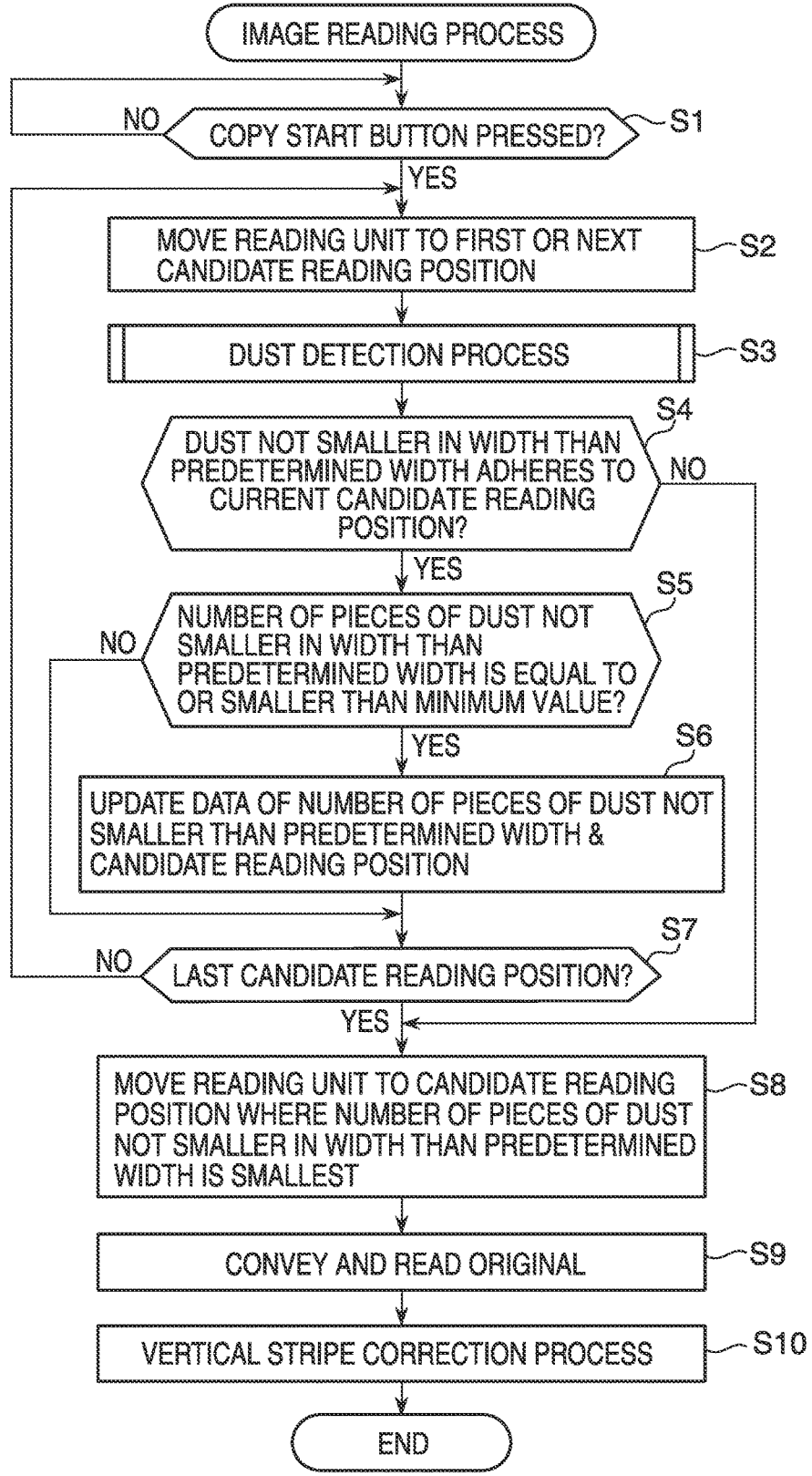
FIG. 4 is a flowchart of an image reading process performed by the image reading apparatus.

FIG. 4 is a flowchart of the image reading process performed by the image reading apparatus 100 shown in FIG. 1. This image reading process is performed by the CPU 803 of the controller 802 according to an image reading process program stored in the ROM 804.

Referring to FIG. 4, first, the CPU 803 determines whether or not a copy start button, not shown, on the operation panel 801 has been pressed by a user, and if not, waits until the copy start button is pressed (step S1). If the copy start button has been pressed (YES to the step S1), the CPU 803 controls the motor 201 to move the reading unit 127 to a predetermined first candidate reading position or to a next candidate reading position (step S2). Note that when the step S2 is first executed, the reading unit 127 is caused to move to the predetermined first candidate reading position.

The candidate reading position is a position in a sub scanning direction within a reading area opposed to the white opposed member 114, which indicates a linear location on the original platen glass 118 along a main scanning direction, and is a candidate position where the reading unit 127 reads an image from an original.

After the reading unit 127 has been moved to the predetermined first or next candidate reading position, the process proceeds to a step S3, wherein a dust detecting process is performed. More specifically, the CPU 803 controls the reading unit 127 to read an image at the candidate reading position, receives image data of one line fed back from the image processor 811, and counts the number of pieces of dust each having a size not smaller in width than a predetermined width at the candidate reading position. The dust detection process detects the presence or absence of dust as foreign matter, the number of pieces of dust, and the position and size of each piece of dust. The dust detection process will be described in detail hereinafter as a subroutine with reference to FIG. 8.

Figure 5:
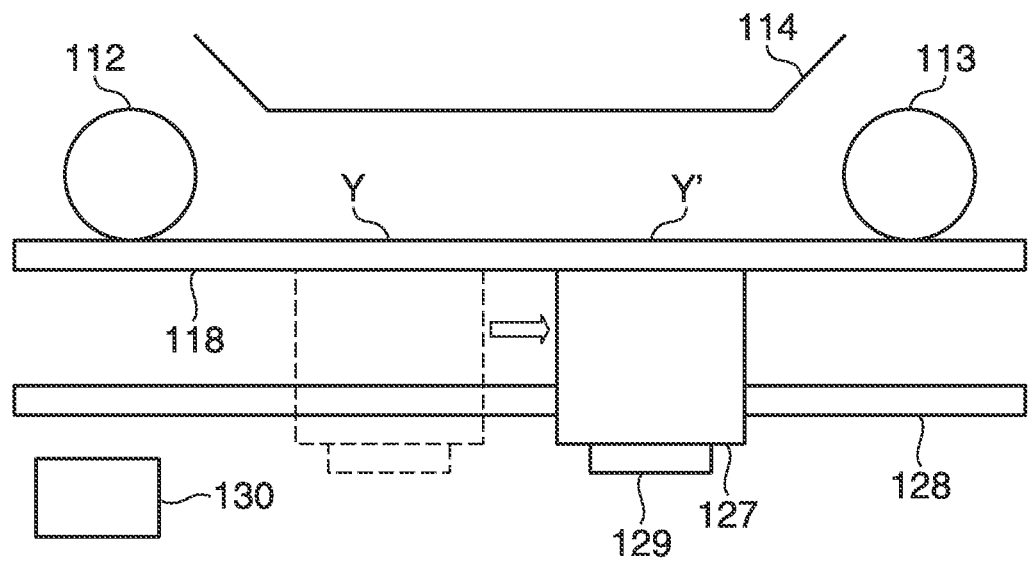
FIG. 5 is a schematic enlarged cross-sectional view of the vicinity of a reading position in the image reading apparatus.

FIG. 5 is a schematic enlarged cross-sectional view of the vicinity of the reading position in the image reading apparatus 100 shown in FIG. 1. Referring to FIG. 5, an image is read while moving the reading unit 127 from a candidate reading position Y to a candidate reading position Y' on the original platen glass 118.

Figures 6A, 6B, 6C:
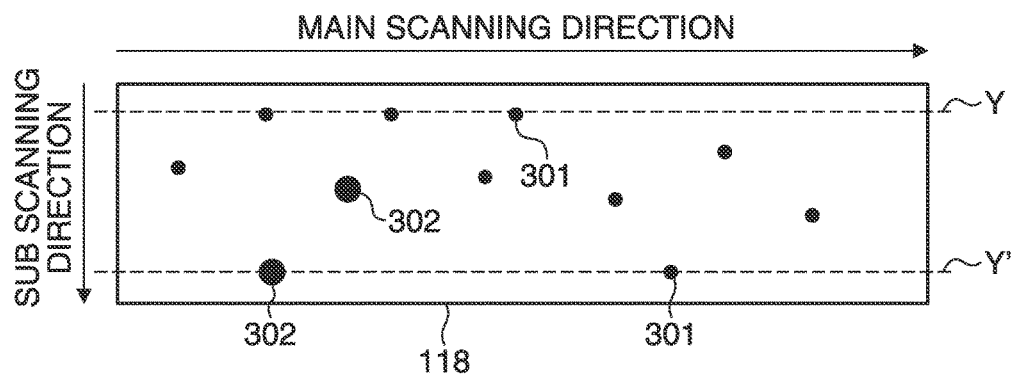
FIG. 6A is a conceptual diagram of dust adhering to an original platen glass which is used for reading an image after sequentially moving a reading unit, on an image reading operation-by-image reading operation basis, to each of positions in a range from a candidate reading position Y to a candidate reading position Y'.
FIG. 6B is a table showing a result of counting the number of large dusts each having a size not smaller in width than a predetermined width and adhering to candidate reading positions appearing in FIG. 6A.
FIG. 6C is a table showing a result of counting the number of large dusts each having a size not smaller in width than the predetermined width and adhering to the candidate reading positions appearing in FIG. 6A and the number of small dusts each having a size smaller in width than the predetermined width and adhering to the candidate reading positions appearing in FIG. 6A.

FIG. 6A is a conceptual diagram of dust adhering to the original platen glass 118 which is used for reading an image after sequentially moving the reading unit 127, on an image reading operation-by-image reading operation basis, to each of positions in a range from the candidate reading position Y to the candidate reading position Y'. Referring to FIG. 6A, there are a plurality of small pieces of dust, indicated by reference numeral 301, and a plurality of large pieces of dust, indicated by reference numeral 302, which adhere to part of the original platen glass 118 in a range from the candidate reading position Y to the candidate reading position Y'.

In the moving original reading mode in which an image is read from an original while conveying the original using the ADF, the image is read when the conveyed original passes a predetermined reading position on the original platen glass 118. Therefore, when the original is conveyed, dust, such as paper dust on the original and flakes of toner as developer, sometimes adheres to the original platen glass 118.

Figure 7A:
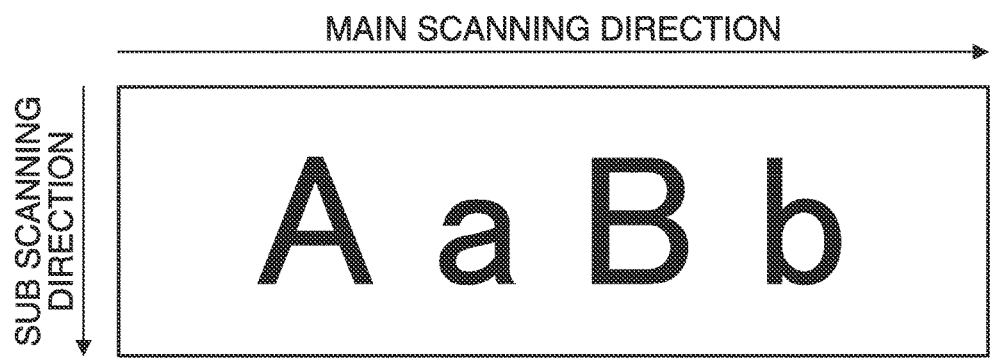
FIG. 7A is a view of an image read from an original in a state where there is no dust at a reading position.

Even when dust adheres to the original platen glass 118, if no piece of dust is present at the reading position, for example, an image shown in FIG. 7A is obtained as the image read from the original. FIGS. 7A to 7E are diagrams each showing an image read from the original, and FIG. 7A shows the image read from the original in a state where there is no piece of dust adhering to the reading position.

Figure 7B:
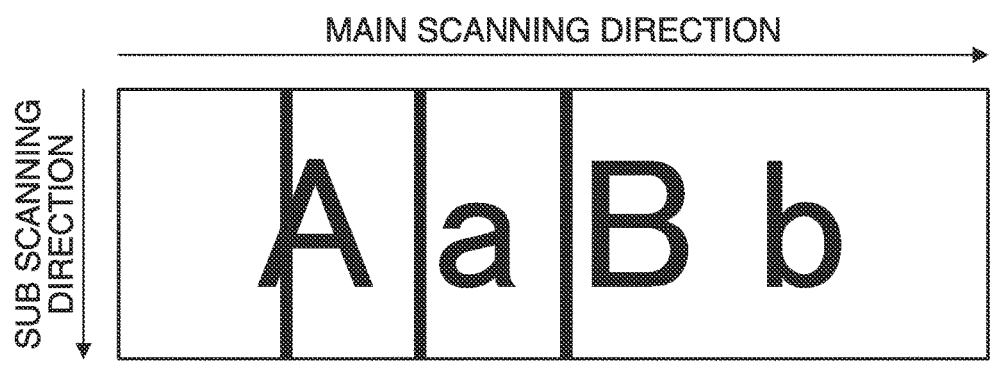
FIG. 7B is a view of an image read from the original in a state where there are small dusts at a reading position.
Figure 7C:
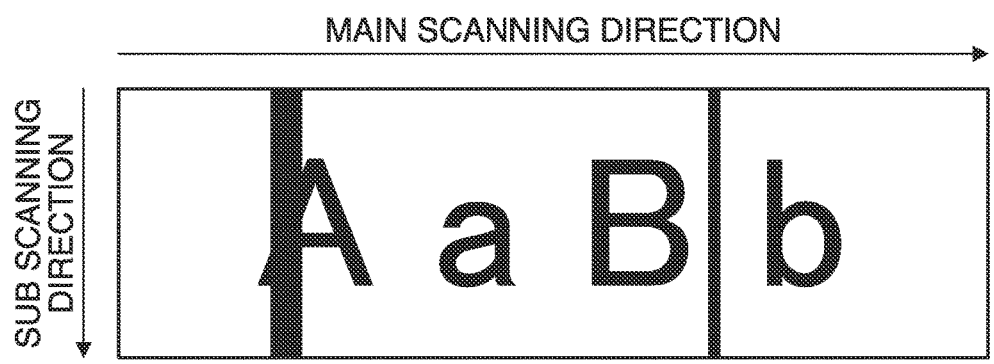
FIG. 7C is a view of an image read from the original in a state where there is a large dust at a reading position.

On the other hand, when the reading position is set to the candidate reading position Y in FIG. 6A, there are pieces of dust adhering to the candidate reading position Y, and hence an image shown in FIG. 7B is obtained as the image read from the original. FIG. 7B shows the image which is read from the original in a state where there are pieces of dust adhering to the reading position. In FIG. 7B, three vertical stripes, which are an abnormal image, appear on the image at respective positions in the main scanning direction, which correspond to the positions of three small pieces of dust 301 adhering to the candidate reading position Y in FIG. 6A. Further, when the reading position is set to the candidate reading position Y' in FIG. 6A, there is a large piece of dust 302 at the candidate reading position Y', and hence an image shown in FIG. 7C is obtained as the image read from the original. FIG. 7C shows the image which is read from the original in a state where there is the large piece of dust 302 adhering to the reading position. In FIG. 7C, a thick vertical stripe and a thin vertical stripe appear on the image at respective positions in the main scanning direction, which correspond to the positions of the large piece of dust 302 and a small piece of dust 301 adhering to the candidate reading position Y' in FIG. 6A.

In a case where a vertical stripe generated by dust appears in an image read from an original, image processing for eliminating the influence of dust (hereinafter referred to as the "vertical stripe correction process") is performed. Although the vertical stripe correction process will be described in detail hereinafter with reference to FIG. 10, in the present embodiment, a piece of dust having such an unacceptable width (size) as will cause characters and the like in a read image to be crushed and become illegible even after the vertical stripe correction process is performed is defined as a piece of dust having a size not smaller in width than a predetermined width. For example, in a case where the reading unit 127 has a resolution of 600 dpi, the predetermined width is set to a width not smaller than a width corresponding to five pixels (0.212 mm). In a case where the resolution is 600 dpi, if the width of a piece of dust is smaller in terms of the number of pixels than the five pixels (0.212 mm), it is possible to eliminate the influence of the piece of dust by performing the vertical stripe correction. On the other hand, if the width of a piece of dust is not smaller than the five pixels (0.212 mm), it is difficult to eliminate the influence of the piece of dust by performing the vertical stripe correction. The small piece of dust 301 appearing in FIG. 6A is acceptable dust having a size smaller in width than the width corresponding to five pixels, and the large piece of dust 302 is unacceptable dust having a size not smaller in width than the width corresponding to five pixels. Hereafter, each large piece of dust having a size larger in width than a predetermined width (0.0212 mm corresponding to five pixels in the case of a resolution of 600 dpi) is simply referred to as "a large dust 302", and each small piece of dust having a size smaller in width the predetermined width is simply referred to as "a small dust 301".

Referring again to FIG. 4, after counting the number of large dusts 302 (step S3), the CPU 803 determines whether or not there is any large dust 302 adhering to the current candidate reading position based on a result of the counting, i.e. whether or not the number of large dusts 302 adhering to the current candidate reading position is larger than 0 (step S4).

FIG. 6B shows a result of counting of large dusts 302, which is performed with respect to the candidate reading position Y and the candidate reading position Y' in FIG. 6A.

It is known from FIG. 6B that no large dust 302 is detected at the candidate reading position Y, whereas one large dust 302 is detected at the candidate reading position Y'.

If it is determined in the step S4 that there is any large dust 302 adhering to the current candidate reading position (YES to the step S4), the process proceeds to a step S5, wherein the CPU 803 compares the number $D_L$ of detected large dusts 302 with the minimum value $D_{min}$ of the number of large dusts 302 detected thus far at other candidate reading positions, and determines whether or not the number $D_L$ of large dusts 302 detected at the current candidate reading position is equal to or smaller than the minimum value $D_{min}$. Note that it is assumed that the minimum value $D_{min}$ of the number of large dusts 302 counted thus far at the other candidate reading positions has been stored e.g. in the RAM 805.

If it is determined in the step S5 that the number DL of large dusts 302 detected at the current candidate reading position is equal to or smaller than the stored minimum value $D_{min}$ (YES to the step S5), the process proceeds to a step S6, wherein the CPU 803 updates data indicative of the candidate reading position and data indicative of the minimum value $D_{min}$ of the number of large dusts 302, which are stored in the RAM 805, with data $Y_n$ indicative of the current candidate reading position and data indicative of the number $D_L$ of large dusts 302 (step S6). Note that in a case where the current candidate reading position is the first candidate reading position, the data $Y_n$ indicative of the current candidate reading position and the data indicative of the number DL of large dusts 302 are stored in the RAM 805 as the data indicative of the candidate reading position and the data indicative of the minimum value $D_{min}$ of the number of large dusts 302.

After the data indicative of the candidate reading position and the data indicative of the number of large dusts 302 have been updated (step S6), the CPU 803 determines whether or not the current candidate reading position is the last candidate reading position (step S7). If it is determined in the step S7 that the current candidate reading position is the last one (YES to the step S7), the process proceeds to a step S8, wherein the CPU 803 determines a candidate reading position where the number of large dusts 302 is the smallest, i.e. equal to the minimum value $D_{min}$ as the reading position, and moves the reading unit 127 to the determined reading position (step S8).

Now, let it be assumed that the current candidate reading position is at Y' in FIG. 6A, and the reading unit 127 has finished reading of an image at the candidate reading position Y'. At this time point, if the candidate reading position Y is determined as the reading position, the reading unit 127 is once returned to the reference position where the flag sensor 139 is disposed, and is moved therefrom by a required number of motor steps. This makes it possible to reliably move the reading unit 127 to the determined reading position.

After the reading unit 127 has been moved to the determined reading position, the CPU 803 starts to convey an original and reads an image from the original at the reading position (step S9). More specifically, when conveyance of the original is started, flag signals each indicating passage of the original are transmitted from respective sensors, not shown, provided in the conveying path 90 to the CPU 803. The CPU 803 controls the timer 806 based on the received flag signals to start time counting, and controls the line sensor 125 of the reading unit 127 to start reading of the original in accordance with timing at which the original reaches the reading position, whereby an image is read from the original.

Then, the CPU 803 performs the vertical stripe correction process on the read image (step S10), followed by terminating the present process. The vertical stripe correction process will be described in detail hereinafter as a subroutine with reference to FIG. 10.

On the other hand, if it is determined in the step S7 that the current candidate reading position is not the last one (NO to the step S7), the CPU 803 returns to the step S2, and repeats a series of processing from the step S2 to the step S6.

Further, if it is determined in the step S4 that there is no large dust 302 adhering to the current candidate reading position (NO to the step S4), the process directly proceeds to the step S8, wherein the CPU 803 determines the current candidate reading position as the reading position, and moves the reading unit 127 to the determined reading position. Further, if it is determined in the step S5 that the number $D_L$ of large dusts 302 is larger the minimum value (NO to the step S5), the process directly proceeds to the step S7. As a result, the candidate reading position at which the number $D_L$ of large dusts 302 is larger than the minimum value $D_{min}$ is excluded from the candidates for selection of the reading position.

According to the image reading process in FIG. 4, a candidate reading position where there is no large dust 302 is determined as the reading position, or a candidate reading position where there is dust but the influence of the dust is expected to be as little as possible is determined as the reading position. This makes it possible to suppress an image read from an original being adversely affected by vertical stripes generated by dust, as much as possible.

Although in the present embodiment, the candidate reading positions are described by taking an example of the two candidate reading positions Y and Y', the number of candidate reading position is by no means limited to two. For example, in a range from the candidate reading position Y to the candidate reading position Y', each of positions in the sub scanning direction at intervals of e.g. one pixel (corresponding to 0.042 mm in the case of a resolution of 600 dpi) or six pixels (corresponding to 0.254 mm in the case of a resolution of 600 dpi) may be set as a candidate reading position, and image reading may be performed at each candidate reading position.

Further, in the present embodiment, if the current candidate reading position is the first candidate reading position, and there is a large dust 302 thereat, the data $Y_n$ indicative of the current candidate reading position and the data indicative of the number $D_L$ of large dusts 302 are stored in the RAM 805 as the data indicative of the candidate reading position and the data indicative of the minimum value $D_{min}$ of the number of large dusts 302, and hence if all candidate reading positions except the first candidate reading position are excluded as a result of determination at the step S5, the first candidate reading position is employed as the reading position. Further, if there is a candidate reading position where no large dust 302 is found as a result of the execution of the step S4 (NO to the step S4), since the number of large dusts 302 is equal to 0, it is unnecessary to execute the step S5, and naturally, this candidate reading position is determined as the reading position. Therefore, detection and measurement of dust at the following candidate reading positions are stopped, and the candidate reading position where no large dust 302 is found is determined as the reading position.

Hereafter, the description will be given of the dust detection process performed in the step S3 in FIG. 4.

Figure 8:
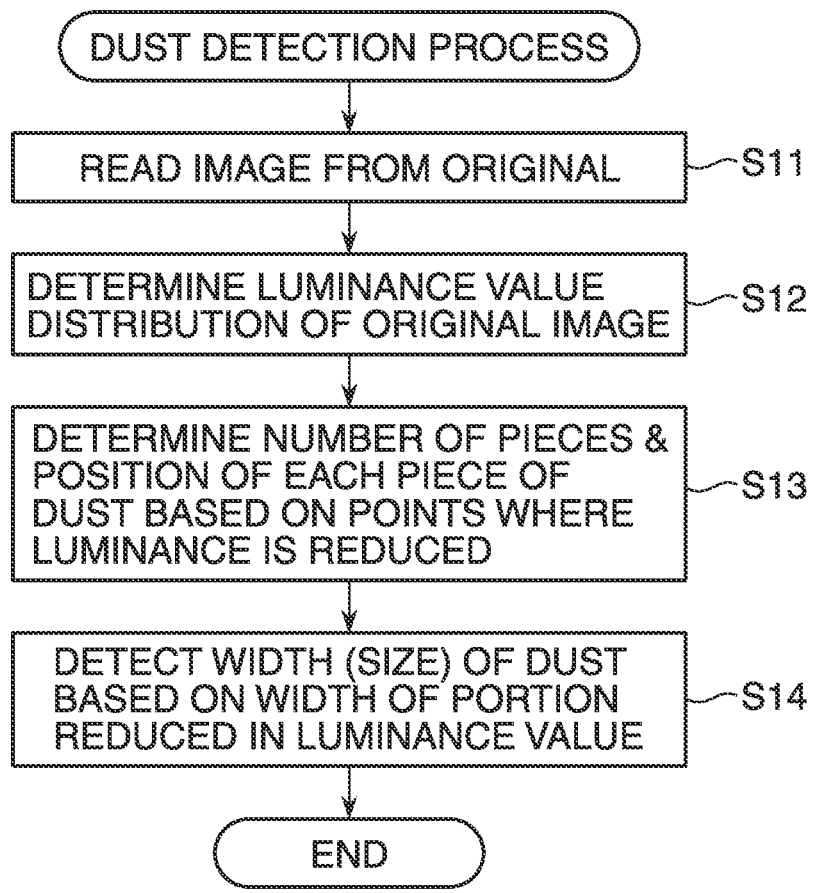
FIG. 8 is a flowchart of a dust detection process performed in a step in FIG. 4.

FIG. 8 is a flowchart of the dust detection process performed in the step S3 in FIG. 4. The dust detection process is performed by the CPU 803 of the image reading apparatus 100 according to a dust detection process program stored in the ROM 804.

Referring to FIG. 8, the CPU 803 controls the reading unit 127 moved to the first or next candidate reading position to read an image from the original at the candidate reading position (step S11). Then, the CPU 803 calculates a luminance value distribution with respect to data of the original image read by the reading unit 127 and fed back to the controller 802 after being subjected to processing performed by the analog processing circuit 809, the A/D converter 810, and the image processor 811 (step S12).

Figure 9:
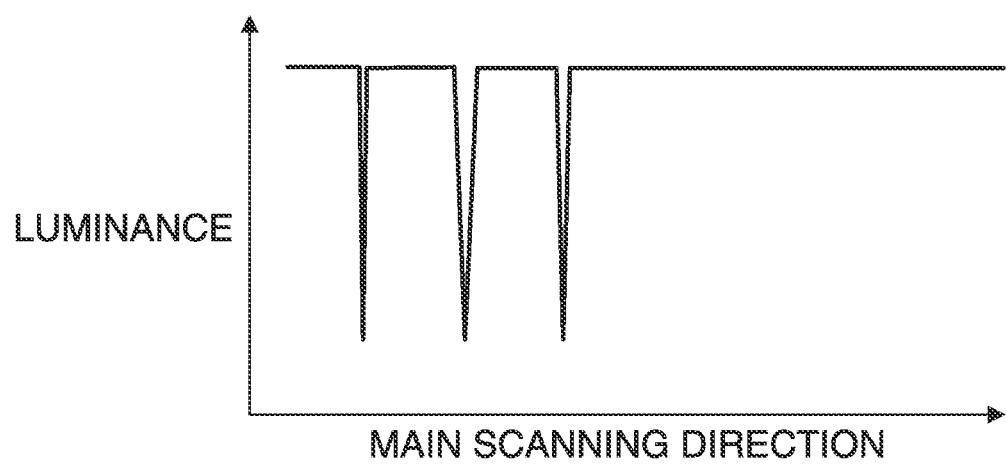
FIG. 9 is a diagram showing a luminance value distribution at a candidate reading position.

FIG. 9 is a diagram showing the luminance value distribution calculated at the candidate reading position.

Referring to FIG. 9, at points where dust is present, an amount of reflected light is reduced because light irradiated from the light source is blocked by the dust, and hence the luminance values of pixels corresponding to the dust are reduced. On the other hand, at points where no dust is present, the white opposed member 114 is read, and hence the amount of reflected light is not reduced, so that the luminance values of the corresponding pixels remain high.

After calculating the luminance value distribution, the CPU 803 determines the presence or absence of dust based on whether or not there is a point in the luminance value distribution where the luminance is reduced, and determines the number of pieces of dust based on the number of points where the luminance is reduced. Further, the CPU 803 determines the position of each piece of dust based on the position of each point where the luminance is reduced (step S13). In FIG. 9, the luminance is reduced at three points, and hence it is found that there are three pieces of dust at the candidate reading position. Further, the positions of the three pieces of dust are detected based on the respective positions of the three points where the luminance is reduced.

Then, the CPU 803 detects the width of a piece of dust, i.e. the size of a piece of dust based on the width of a portion in the luminance value distribution where the luminance is reduced (step S14), followed by the present dust detection process.

According to the dust detection process in FIG. 8, the luminance value of each pixel of the line sensor 125 at the candidate reading position is obtained, whereby it is possible to accurately detect the presence or absence of dust, the number of pieces of dust, and the position where each piece of dust adheres, based on the position of each pixel where the luminance is reduced. Further, it is possible to accurately detect the size of each piece of dust based on the width of each portion where the luminance is reduced in FIG. 9.

Further, a description will be given, hereafter, of the vertical stripe correction process performed in the step S10 in FIG. 4.

Figure 10:
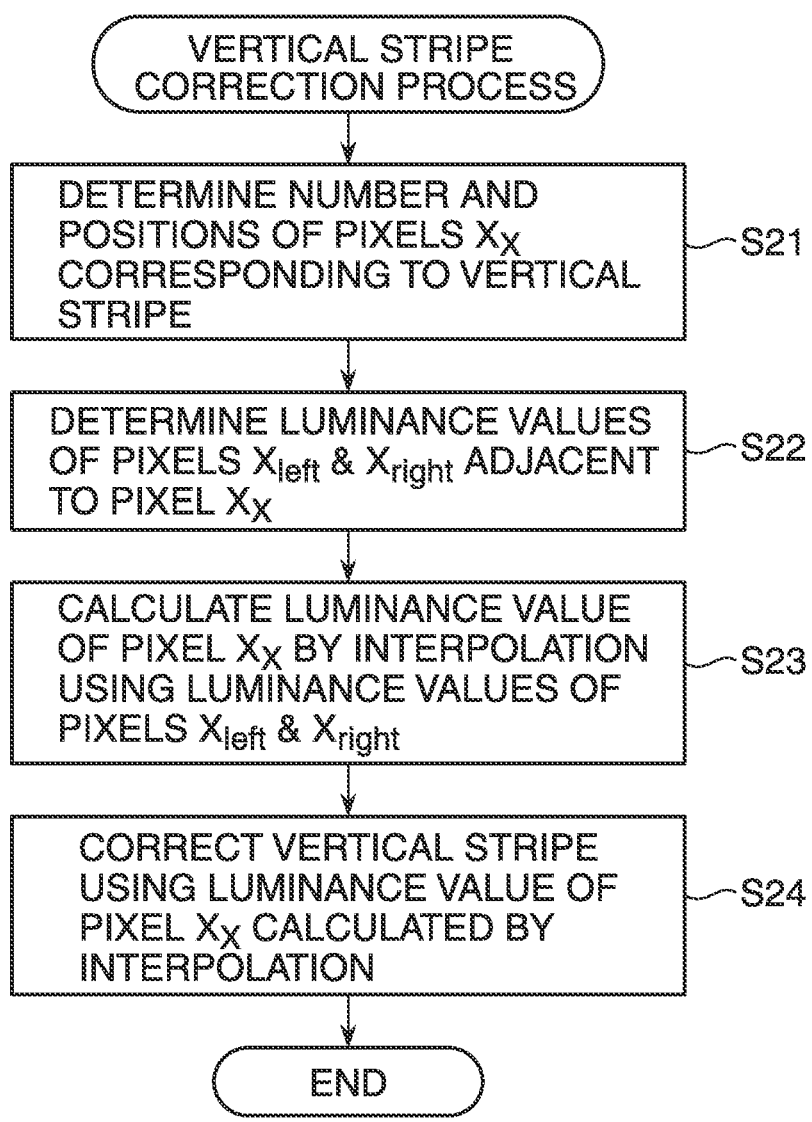
FIG. 10 is a flowchart of a vertical stripe correction process performed in a step in FIG. 4.

FIG. 10 is a flowchart of the vertical stripe correction process performed in the step S10 in FIG. 4. The vertical stripe correction process is performed by the CPU 803 of the image reading apparatus 100 according to a vertical stripe correction process program stored in the ROM 804.

Figure 11:
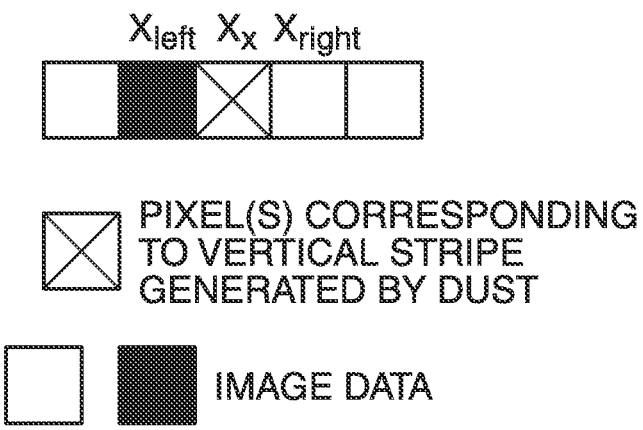
FIG. 11 is a diagram of pixels including a pixel corresponding to a vertical stripe, which is useful in explaining luminance value interpolation in the vertical stripe correction process.

Referring to FIG. 10, when the vertical stripe correction process is started, the CPU 803 determines the number and positions of pixels $X_x$ (illustrated and described as one pixel for simplification, though the illustration is intended to represent a plurality of pixels as well) corresponding to a vertical stripe in the image read from the original (step S21). FIG. 11 is a diagram of pixels including the pixel $X_x$ corresponding to a vertical stripe, which is useful in explaining luminance value interpolation in the vertical stripe correction process. Then, the CPU 803 determines luminance values of a pixel $X_{left}$ and a pixel $X_{right}$, which are adjacent to the pixel $X_x$ and do not correspond to the stripe (step S22). After determining the luminance values of the pixel $X_{left}$ and the pixel $X_{right}$, the CPU 803 calculates a luminance value of the pixel $X_x$ using the obtained luminance values of the pixel $X_{left}$ and the pixel $X_{right}$ through interpolation by the following equation (1) (Step S23).

$$X_x = X_{left} + (X_{right} - X_{left})/(n+1) \times x \qquad (1)$$

Figure 12:
FIG. 12 is a diagram of the pixels including the pixel corresponding to the vertical stripe after being subjected to luminance value interpolation.

$X_x$: luminance value of the pixel $X_x$
$X_{left}$: luminance value of the pixel $X_{left}$
X $X_{right}$: luminance value of the pixel $X_{right}$
n: number of pixels, which corresponds to the width of a stripe
x: number of pixels, which corresponds to a distance from the pixel $X_{left}$ FIG. 12 is a diagram of the pixels including the pixel $X_x$ corresponding to the vertical stripe after being subjected to luminance value interpolation. Referring to FIG. 12, shading of the pixel $X_x$ indicates that the luminance value of the pixel $X_x$ before the luminance value interpolation which is expressed by "X" in FIG. 11 has been corrected by a value determined anew by interpolation. After correcting the luminance value of each pixel $X_x$ by the luminance value interpolation, the CPU 803 corrects the vertical stripe in the image read from the original using luminance values thus corrected (step S24), followed by terminating the present process. A vertical stripe to be subjected to the vertical stripe correction process is determined as appropriate based on the size of a piece of dust corresponding to the vertical stripe.

For example, the vertical stripe correction process performed on the read images in FIGS. 7B and 7C, described above, gives images shown in FIGS. 7D and 7E, respectively. From FIGS. 7D and 7E, it is known that the influence of the dust is markedly reduced by the vertical stripe correction process and the vertical stripes are almost eliminated.

Figure 7D:
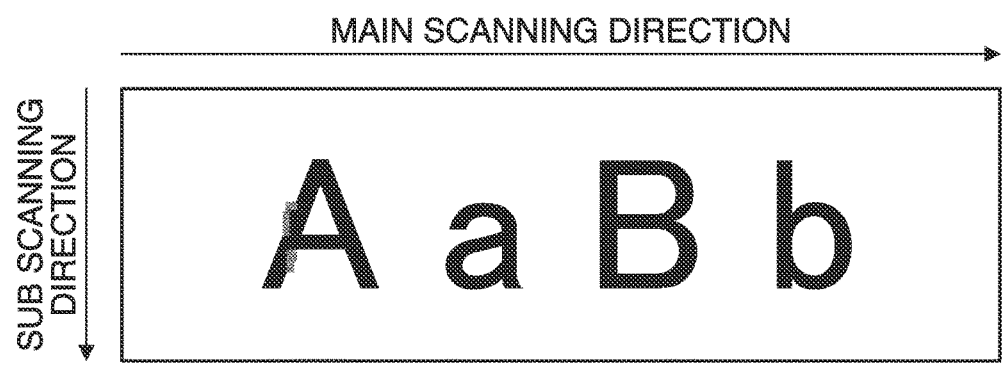
FIG. 7D is a view of an image read from the original and having been subjected to vertical stripe correction, which corresponds to FIG. 7B.
Figure 7E:
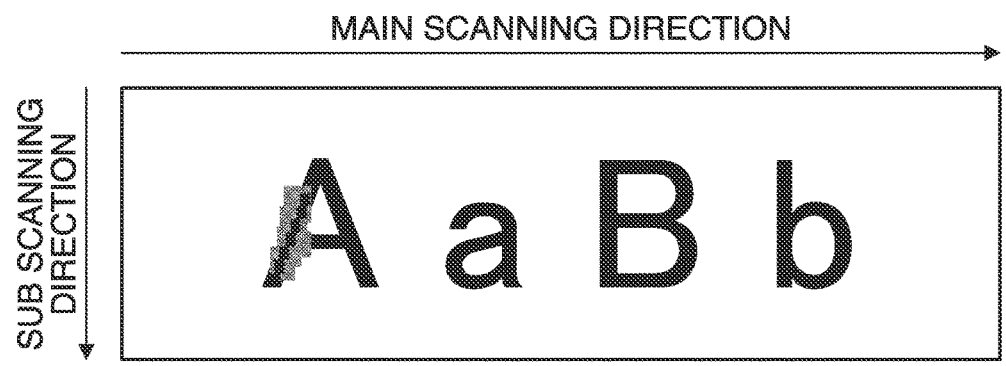
FIG. 7E is a view of an image read from the original and having been subjected to vertical stripe correction, which corresponds to FIG. 7C.

As is clear from FIGS. 7D and 7E, the influence of dust on the image read from the original depends not only on the number of pieces of dust (the number of vertical stripes), but also on the size of dust (width of a vertical stripe). Therefore, when determining the reading position, it is preferable not only to select a candidate reading position where the number of pieces of dust adhering thereto is small, but also to determine, as the reading position, a candidate reading position where only small pieces of dust adhere thereto which has less adverse effect of vertical stripes on the original image subjected to the vertical stripe correction process.

According to the vertical stripe correction process in FIG. 10, the luminance values of pixels corresponding to a vertical stripe are corrected by luminance value interpolation using luminance values of pixels adjacent thereto, and the vertical stripe is corrected based on the corrected luminance values. Therefore, it is possible to effectively correct vertical stripes caused by the presence of dust.

Next, a description will be given of a second embodiment.

The image reading apparatus according to the second embodiment has the same hardware configuration as the image reading apparatus according to the first embodiment, and is different only in software of a control process. The following description will be given mainly of different points of an image reading process performed in the present embodiment from the image reading process (FIG. 4) in the first embodiment. This image reading process is performed by the CPU 803 of the image reading apparatus 100 according to an image reading process program stored in the ROM 804.

Figure 13:
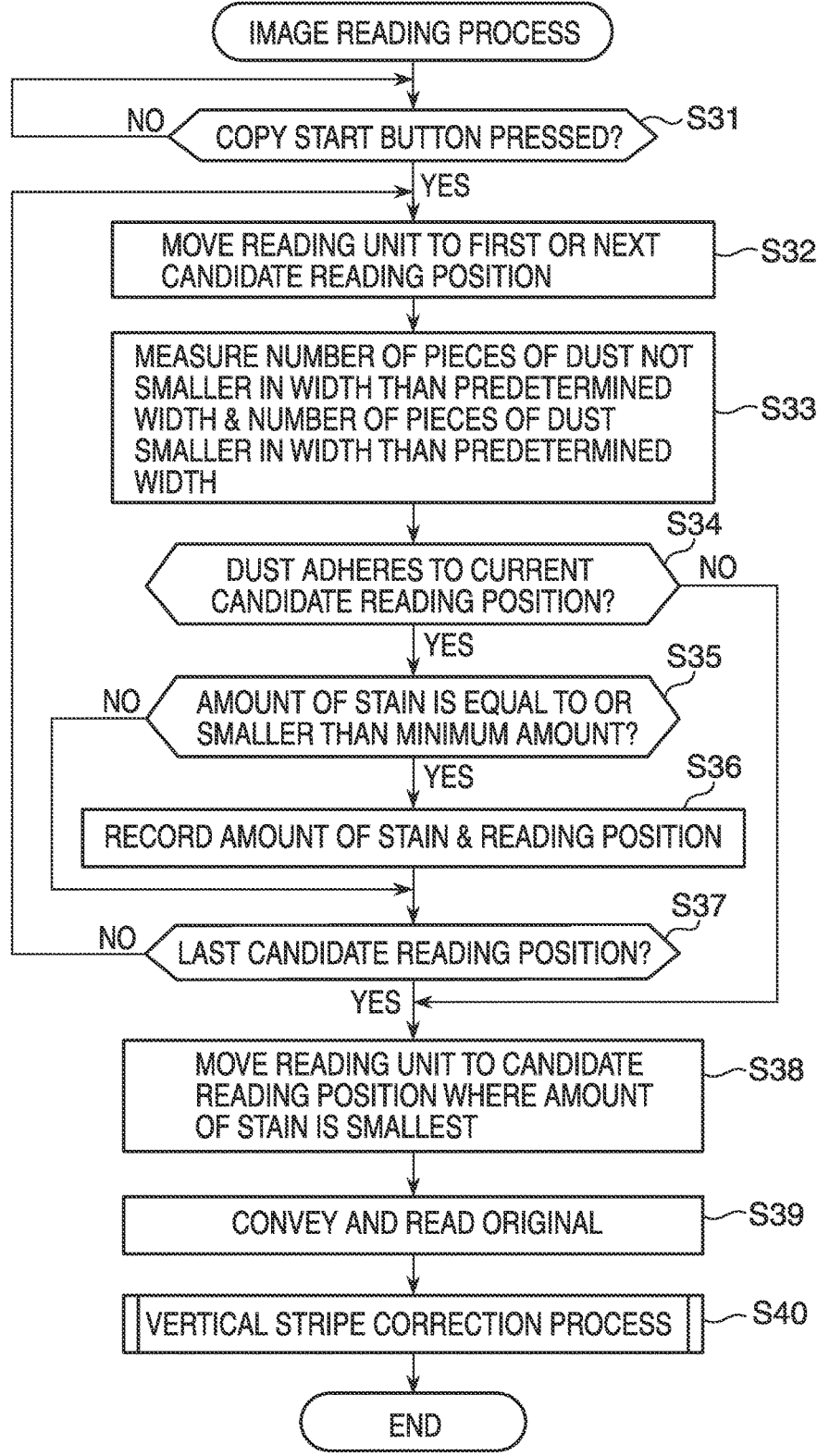
FIG. 13 is a flowchart of an image reading process performed in a second embodiment.

FIG. 13 is a flowchart of the image reading process performed in the present embodiment.

In the present image reading process, counting is to be performed not only on the number of pieces of dust each having a size not smaller in width than a predetermined width, but also on the number of pieces of dust each having a size smaller in width than the predetermined width, and a candidate reading position where even if dust is present, the influence of dust is as small as possible, is determined as the reading position, whereby an image is read from an original at the determined reading position.

Referring to FIG. 13, steps S31 and S32 are the same as the steps S1 and S2 in the first embodiment (FIG. 4). Further, the dust detection process and the vertical stripe correction process are the same as those of the first embodiment. Therefore, description of these steps and processes is omitted.

After the reading unit 127 has been moved to the next candidate reading position (step S32), the process proceeds to a step S33, wherein the CPU 803 receives image data of one line fed back from the image processor 811, and counts the number of pieces of dust each having a size not smaller in width than the predetermined width, and the number of pieces of dust each having a size smaller in width than the predetermined width, which dust adheres to the candidate reading position (step S33).

FIG. 6C shows a result of counting the number $D_L$ of pieces of dust having a size not smaller in width than the predetermined width, and the number $D_S$ of pieces of dust having a size smaller in width than the predetermined width, which dust adheres to the above-mentioned candidate reading positions Y and Y' in FIG. 6A. Similar to the above-described embodiment, a piece of dust having a size not smaller in width than the predetermined width is e.g. a piece of dust having a size not smaller in width than the width corresponding to five pixels in a case of a resolution of 600 dpi, and a piece of dust having a size smaller in width than the predetermined width is e.g. a piece of dust having a size smaller in width than the width corresponding to five pixels in the case of a resolution of 600 dpi. The piece of dust having a size not smaller in width than the width corresponding to five pixels is a piece of dust which generates a vertical stripe which is difficult to be corrected by image processing (vertical stripe correction process), and the piece of dust having a width smaller than the width corresponding to five pixels is dust which is easy to be corrected by the vertical stripe correction process.

As is clear from FIG. 6C, at the candidate reading position Y, the count of the number of pieces of dust each having a size not smaller in width than the predetermined width is zero, but the count of the number of pieces of dust each having a size smaller in width than the predetermined width is three. On the other hand, at the candidate reading position Y', the count of the number of pieces of dust each having a size not smaller in width than the predetermined width is one and the count of pieces of dust each having a size smaller in width than the predetermined width is one, i.e. the total count is two.

Referring again to FIG. 13, after counting the number of pieces of dust, the CPU 803 determines whether or not there is dust adhering to the current candidate reading position (step S34). If it is determined in the step S34 that there is dust adhering to the current candidate reading position (YES to the step S34), the process proceeds to a step S35, wherein the CPU 803 calculates an amount $D_Q$ of stain caused by the dust based on an equation (2), referred to hereinafter, and compares the amount $D_Q$ of stain with the minimum amount $D_{Qmin}$ of stain calculated thus far at other candidate reading positions to thereby determine whether or not the amount $D_Q$ of stain at the current candidate reading position is equal to or smaller than the minimum amount $D_{Qmin}$ of stain (step S35).

In the present embodiment, the concept of "the amount of stain" is introduced, and a candidate reading position where the amount of stain is the smallest is determined as the reading position. More specifically, a plurality of weighting coefficients are set in association with different sizes of pieces of dust, for selective assignment to each piece of dust adhering to a candidate reading position and having a corresponding size, and the amount of stain at the candidate reading position is calculated based on the weighting coefficients and the number of pieces of adhering dust having a size to which each of the weighting coefficients is assigned.

The weighting coefficients are set in advance by taking into account respective degrees of influence on the vertical stripe correction process, which are caused by pieces of dust having different sizes, and the amount $D_Q$ of stain at a candidate reading position is calculated using a weighting coefficient L for pieces of dust each having a size not smaller in width than the predetermined width and weighting coefficient S for pieces of dust each having a size smaller in width than the predetermined width, by the following equation (2).

$$D_n = D_L \times L + D_s \times S \qquad (2)$$

$D_L$: number of pieces of dust each having a size not smaller in width than the predetermined width $D_s$: number of pieces of dust each having a size smaller in width than the predetermined width L: weighting coefficient for pieces of dust each having a size not smaller in width than the predetermined width S: weighting coefficients for pieces of dust each having a size smaller in width than the predetermined width Here, assuming that the weighting coefficient L for pieces of dust having a size not smaller in width than the predetermined width is 4, and the weighting coefficient S for pieces of dust having a size smaller in width than the predetermined width is 1, the amount $D_Y$ of stain at the candidate reading position Y in FIG. 6C is calculated as follows:

$$D_Y = 0 \times 4 + 3 \times 1 = 3$$

On the other hand, the amount $D_{Y'}$ of stain at the candidate reading position Y' is calculated as follows:

$$D_{Y'} = 1 \times 4 + 1 \times 1 = 5$$

The amount $D_Y$ of stain at the candidate reading position Y is smaller than the amount $D_{Y'}$ of stain at the candidate reading position Y', and hence by performing the reading operation at the candidate reading position Y, it is possible to read an image from the original, in which the influence of dust is smaller.

Referring again to FIG. 13, if it is determined in the step S35 that the amount $D_Q$ of stain at the current candidate reading position is equal to or smaller than the minimum amount $D_{Qmin}$ of stain (YES to the step S35), the process proceeds to a step S36, wherein the CPU 803 records the current candidate reading position and amount $D_Q$ of stain in the RAM 805 as data, or updates recorded data if the recorded data exists (step S36). Then, the CPU 803 determines whether or not the current candidate reading position is the last candidate reading position (step S37), and if the current candidate reading position is the last one (YES to the step S37), the process proceeds to a step S38, wherein the CPU 803 determines the candidate reading position where the amount of stain is the smallest as the reading position, and moves the reading unit 127 to the determined reading position (step S38). Then, the CPU 803 causes an original to be conveyed to perform reading of an image from the original at the determined reading position (step S39), and then performs the vertical stripe correction process (step S40), followed by terminating the present process.

On the other hand, if it is determined in the step S37 that the current candidate reading position is not the last one (NO to the step S37), the CPU 803 returns to the step S32, and repeats the steps S32 to S36 until the candidate reading position becomes the last one.

Further, if it is determined in the step S34 that there is no dust adhering to the current candidate reading position (NO to the step S34), the process proceeds to the step S38 to determine the current candidate reading position as the reading position. Further, if it is determined in the step S35 that the amount $D_Q$ of stain at the current candidate reading position is not the smallest (NO to the step S35), the process directly proceeds to the step S37.

According to the image reading process in FIG. 13, by introducing the concept of the amount of stain at the candidate reading position, a candidate reading position where the amount of stain is the smallest is determined as the reading position. This makes it possible to read an image from the original at a candidate reading position where even if dust is present, the possibility of generation of vertical stripes by dust is lower and the adverse effect of vertical stripes is reduced in a result of the vertical strip correction process. Therefore, it is possible to perform excellent reading of an image by reducing the influence of dust.

Although in the present embodiment, the candidate reading positions are described by taking an example of the two candidate reading positions Y and Y', the number of candidate reading position is by no means limited to two. Further, similar to the above-described embodiment, in the present embodiment, if all candidate reading positions except the first candidate reading position are excluded as a result of determination at the step S35, the first candidate reading position is employed as the reading position. However, in this case, a default position set in advance may be employed as the reading position.

Further, in the present embodiment, the number of pieces of dust having a size not smaller in width than the predetermined width and the number of pieces of dust having a size smaller in width than the predetermined width are counted. However, by dividing the size of dust into two ranges or three or more ranges, and providing threshold values for each range, the number of pieces of dust within each predetermined range defined by associated threshold values may be counted.

Next, a description will be given of a third embodiment.

The image reading apparatus according to the third embodiment has the same hardware configuration as the image reading apparatus according to the first embodiment, and is different only in software of control processes. The following description will be given mainly of different points of the image reading process performed in the present embodiment from the image reading processes according to the first and second embodiments (FIGS. 4 and 13). This image reading process is performed by the CPU 803 of the image reading apparatus 100 according to an image reading process program stored in the ROM 804.

FIG. 14 is a flowchart of the image reading process performed in the present embodiment.

This image reading process is performed to measure not only the number of pieces of dust each having a size not smaller in width than a predetermined width and the number of pieces of dust each having a size smaller in width than the predetermined width, but also the number of pieces of dust each having a size in width so large as will make it impossible to correct a vertical stripe generated thereby by the vertical stripe correction, and determine a reading position in a manner avoiding a candidate reading position where a piece of dust having a size in width so large as will make it impossible to correct a vertical stripe generated thereby.

Referring to FIG. 14, steps S41 and S42 are the same as the steps S1 and S2 in the first embodiment. Further, the dust detection process and the vertical stripe correction process are also the same as those in the above-described first and second embodiments. Therefore, description of those steps and processes is omitted.

After the reading unit 127 has been moved to the first or next candidate reading position (step S42), the process proceeds to a step S43, wherein the CPU 803 receives image data of one line fed back from the image processor 811, and counts the number of pieces of dust each having a size in width larger than a predetermined width, the number of pieces of dust each having a size smaller in width than the predetermined width, and the number of pieces of dust each having a size in width so large as will make it impossible to correct a vertical stripe generated thereby, which dust adheres to the candidate reading position (step S43).

Figures 15A, 15B:
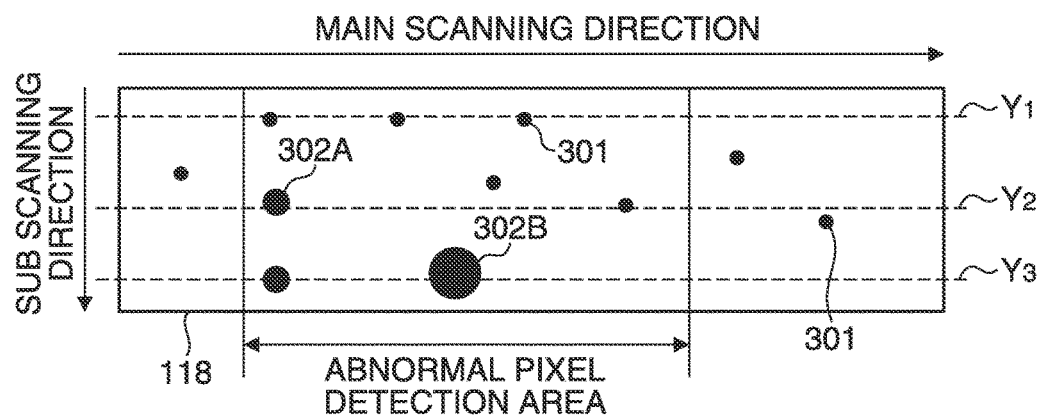
FIG. 15A is a conceptual diagram of dust adhering to an original platen glass which is used for reading an image after sequentially moving a reading unit, on an image reading operation-by-image reading operation basis, to each of positions in a range from a candidate reading position Y1 to a candidate reading position Y3.
FIG. 15B is a table showing a result of counting the number of pieces of dust adhering to each of candidate reading positions appearing in FIG. 15A.

FIG. 15A is a conceptual diagram of dust adhering to the original platen glass 118 which is used when images are each read after sequentially moving the reading unit 127, on an image reading operation-by-image reading operation basis, to each of positions in a range from the candidate reading position Y1 to the candidate reading position Y3.

Referring to FIG. 15A, there are a plurality of pieces of dust adhering to the original platen glass 118. Each of plurality of pieces of dust is classified as one of a small dust 301, a large dust 302A, and an uncorrectably large dust 302B. The small dust 301 is defined, similar to the first embodiment, as a piece of dust having a size smaller in width than the predetermined width, e.g. a piece of dust having a width smaller than the width corresponding to five pixels in the case of a resolution of 600 dpi, and the large dust 302A is defined as a piece of dust having a size not smaller in width than the predetermined width, e.g. a piece of dust which has a width not smaller than the width corresponding to five pixels in the case of a resolution of 600 dpi and will generate a vertical stripe which is correctable by the vertical stripe correction process. Further, the uncorrectably large dust 302B is defined as a piece of dust having a size so large as will generate a vertical stripe which is uncorrectable by the vertical stripe correction process.

Figure 16A:
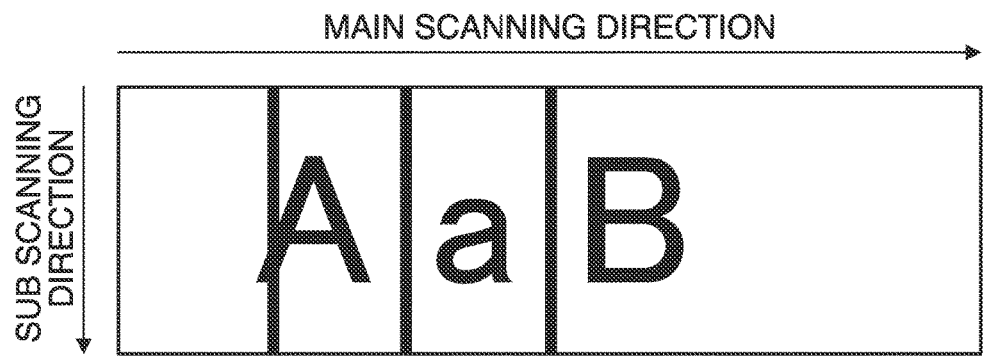
FIG. 16A is a view of an image read from an original in a state where there are small dusts at a reading position.
Figure 16B:
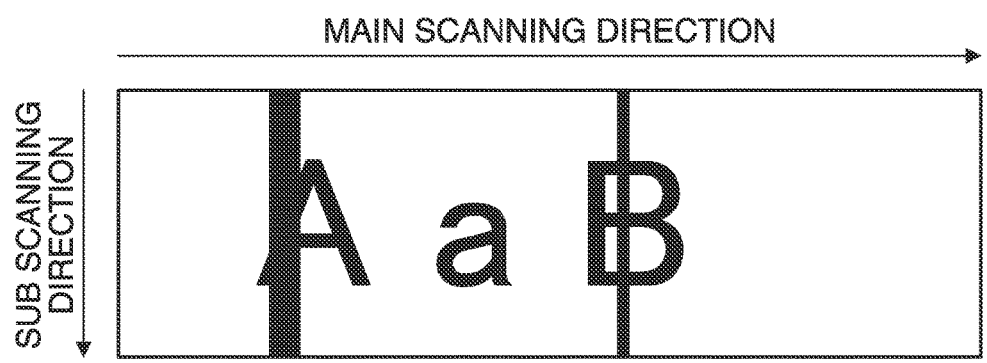
FIG. 16B is a view of an image read from an original in a state where there is a large dust at a reading position.

If there is no dust adhering to the reading position, the read image as shown in FIG. 7A is obtained. However, assuming that the reading position is set to the candidate reading position $Y_1$ in FIG. 15A, there is obtained, e.g. a read image as shown in FIG. 16A, in which thin three vertical stripes are generated at respective locations in the main scanning direction, which correspond to the three small dusts 301. Further, assuming that the reading position is set to a candidate reading position $Y_2$ in FIG. 15A, there is obtained e.g. a read image as shown in FIG. 16B, in which a thick vertical stripe corresponding to the large dust 302 is generated. Furthermore, assuming that the reading position is set to the candidate reading position $Y_3$ in FIG. 15A, there is obtained a read image as shown in FIG. 16C, in which a very wide vertical stripe corresponding to the uncorrectably large dust 302B is generated.

Figure 16C:
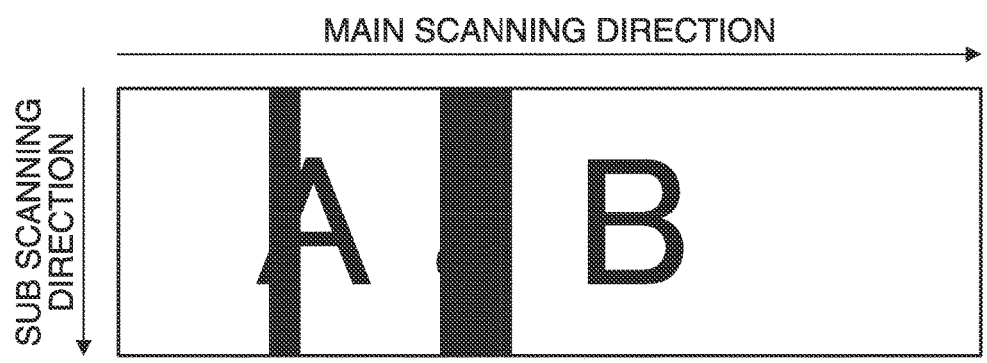
FIG. 16C is a view of an image read from an original in a state where there is an uncorrectably large dust at a reading position.
Figure 16D:
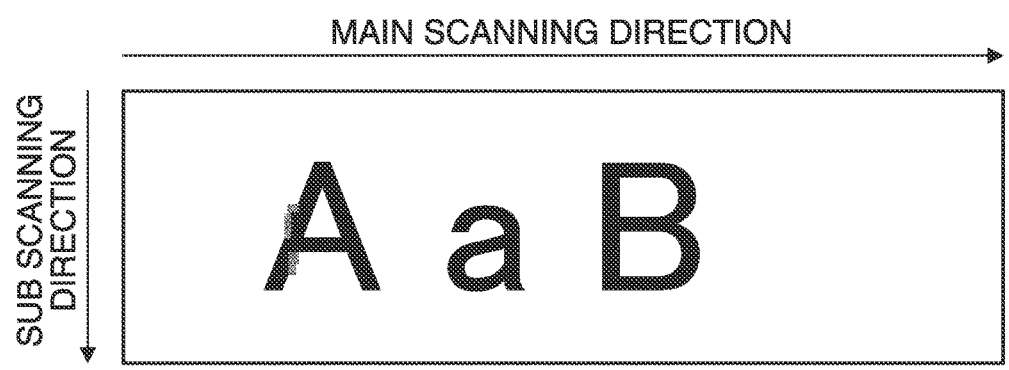
FIG. 16D is a view of an image read from the original and having been subjected to vertical stripe correction, which corresponds to FIG. 16A.
Figure 16E:
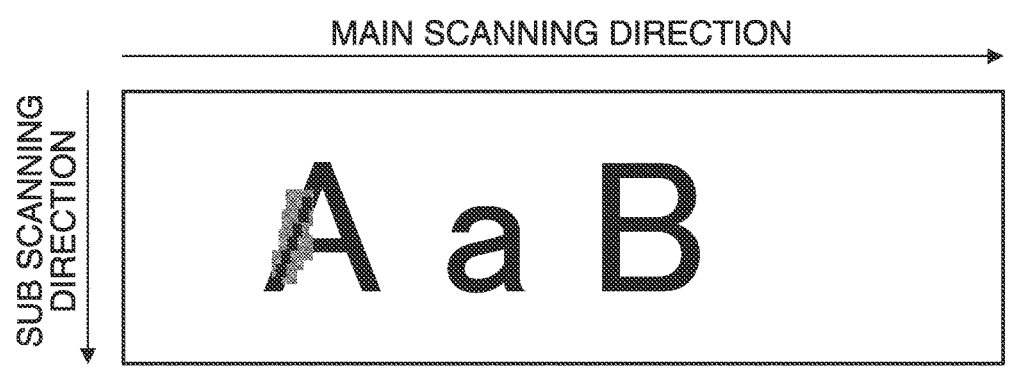
FIG. 16E is a view of an image read from the original and having been subjected to vertical stripe correction, which corresponds to FIG. 16B.
Figure 16F:
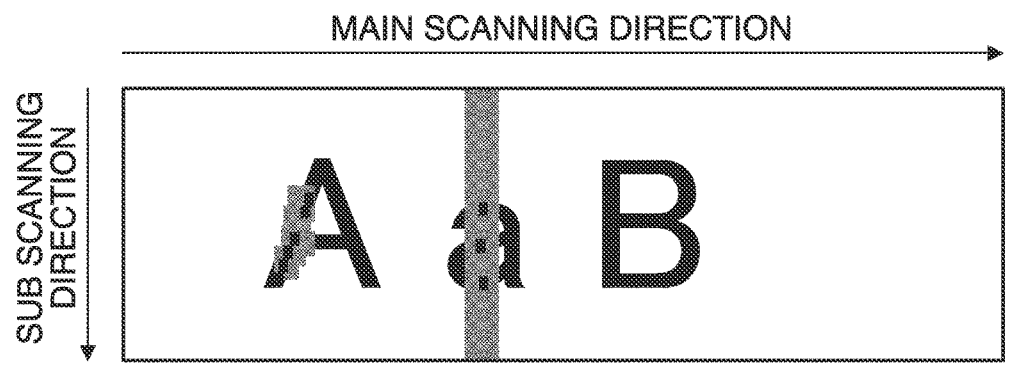
FIG. 16F is a view of an image read from the original and having been subjected to vertical stripe correction, which corresponds to FIG. 16C.

Assuming that the vertical stripe correction process, described in the first embodiment, is performed on the read images shown in FIGS. 16A to 16C, there are obtained images shown in FIGS. 16D to 16F, respectively. It is known from FIG. 16E that the adverse effect of the vertical stripe slightly remains in the read image in which the thick vertical stripe has been generated, even after the vertical stripe correction. Further, it is known from FIG. 16F that the adverse effect of the vertical stripe markedly remains in the read image in which the very wide vertical stripe has been generated, even after the vertical stripe correction.

In other words, although such a thin vertical stripe as appearing in FIG. 16A is easy to be corrected by the vertical stripe correction process, in the case of such a thick vertical stripe as appearing in FIG. 16B, the adverse effect thereof slightly remains in the image even after the vertical stripe correction has been performed. Further, such a very wide vertical stripe as appearing in FIG. 16C is difficult to be corrected. Therefore, the reading of an image at a candidate reading position where adheres an uncorrectably large dust 302B, which causes generation of a very wide vertical stripe, should be avoided. Although it is preferable to determine, as the reading position, a candidate reading position to which no piece of dust adheres, in a case where dust cannot be avoided, it is preferable that a candidate reading position where only pieces of dust adhere which will cause as less adverse effects as possible to remain in an image subjected to the vertical stripe correction process is determined as the reading position.

Referring again to FIG. 14, after counting the number of pieces of dust (step S43), the CPU 803 determines whether or not there is an uncorrectably large dust 302B at the current candidate reading position (step S44).

FIG. 15B shows a result of counting the number of pieces of dust adhering to each of the candidate reading positions $Y_1$, $Y_2$, and $Y_3$ in FIG. 15A.

Referring to FIG. 15B, at the candidate reading position $Y_1$, the count of the number of small dusts 301 is three, and at the candidate reading position $Y_2$, the count of the number of large dusts 302 is one and the count of the number of small dusts 301 is one. Further, at the candidate reading position $Y_3$, the count of the number of large dusts 302A is one and the count of the number of uncorrectably large dusts 302B is one.

If it is determined there is no uncorrectably large dust 302B adhering to the current candidate reading position (NO to the step S44), the CPU 803 determines whether or not there is dust adhering to the current candidate reading position (step S45). If it is determined in the step S45 that there is dust adhering to the current candidate reading position (YES to the step S45), the process proceeds to a step S46, wherein the CPU 803 calculates an amount $D_Q$ of stain generated by the dust by the equation (2) used in the second embodiment, and compares the amount $D_Q$ of stain with the minimum amount $D_{Qmin}$ of stain calculated thus far at other candidate reading positions to thereby determine whether or not the amount $D_Q$ of stain at the current candidate reading position is equal to or smaller than the minimum amount $D_{Qmin}$ of stain (step S46).

The amount of stain is calculated and the weighing coefficients are set, as in the above-described second embodiment. Therefore, the amount $D_{Y1}$ of stain at the candidate reading position $Y_1$ in FIG. 15A is calculated as follows:

$$D_{Y1} = 0 \times 4 + 3 \times 1 = 3$$

On the other hand, the amount $D_{Y2}$ of stain at the candidate reading position $Y_2$ is calculated as follows:

$$D_{Y2} = 1 \times 4 + 1 \times 1 = 5$$

Note that at the candidate reading position $Y_3$, there adheres an uncorrectably large dust 302B, and hence the candidate reading position $Y_3$ is excluded from the candidates for selection of the reading position, as described hereinafter (NO to the step S44).

Since the amount $D_{Y1}$ of stain at the candidate reading position $Y_1$ is smaller than the amount $D_{Y2}$ of stain at the candidate reading position $Y_2$, the candidate reading position $Y_1$ is determined as the reading position, and a reading operation is performed at the thus determined reading position, whereby it is possible to perform an excellent image reading operation in which the influence of dust is reduced.

Referring again to FIG. 14, if it is determined in the step S46 that the amount $D_Q$ of stain at the current candidate reading position is equal to or smaller than the minimum amount $D_{Qmin}$ of stain (YES to the step S46), the process proceeds to a step S47, wherein the CPU 803 records the current candidate reading position and amount of stain in the RAM 805 ad data, or updates recorded data if the recorded data exists (step S47). Then, the CPU 803 determines whether or not the current candidate reading position is the last candidate reading position (step S48), and if the current candidate reading position is the last one (YES to the step S48), the CPU 803 proceeds to a step S49 to determine whether or not there has been recorded a reading candidate position in which the amount of stain is the smallest. If the candidate reading position has been recorded (YES to the step S49), the process proceeds to a step S50, wherein the CPU 803 determines the candidate reading position where the amount of stain is the smallest as the reading position, and moves the reading unit 127 to the determined reading position. Then, the CPU 803 causes an original to be conveyed to perform reading of an image from the original at the determined reading position (step S51), and then performs the vertical stripe correction process (step S52), followed by terminating the present process.

On the other hand, if it is determined in the step S48 that the current candidate reading position is not the last one (NO to the step S48), the CPU 803 returns to the step S42, and repeats the steps S42 to S47 until the candidate reading position becomes the last one.

Further, if it is determined in the step S44 that there is an uncorrectably large dust 302B adhering to the current candidate reading position (YES to the step S44), or if it is determined in the step S46 that the amount $D_Q$ of stain at the current candidate reading position is larger than the minimum amount $D_{Qmin}$ of stain (NO to the step S46), the CPU 803 directly proceeds to the step S48. This excludes a candidate reading position to which the uncorrectably large dust 302B adheres and a candidate reading position where the amount of stain is not the smallest from the candidates for selection of the reading position.

Further, if it is determined in the step S45 that there is no dust adhering to the current candidate reading position (NO to the step S45), the process proceeds to the step S50, wherein the current candidate reading position is determined as the reading position. Further, if it is determined in the step S49 that no reading candidate position where the amount of stain is the smallest has been recorded (NO to the step S49), it is judged that the original platen glass 118 is in a state improper for performing the image reading process, and hence an error message to the effect that it is necessary to perform cleaning of the original platen glass 118 is displayed (step S52), followed by terminating the present process.

According to the present embodiment, even when an uncorrectably large dust 302B, a large dust 302A, and a small dust 301, as defined hereinbefore, are simultaneously detected, it is possible to read an image from an original at a reading position where there is less adverse effect of vertical stripes caused by dust remains even after the vertical stripe correction process for correcting them. Therefore, it is possible to realize excellent reading of an image by reducing the influence of dust.

Further, according to the present embodiment, a candidate reading position where an uncorrectably large dust adheres is excluded from the candidates for selection of the reading position. This makes it possible to realize reading of an image by taking into account pieces of dust generating vertical stripes easy to be corrected by the vertical stripe correction process and pieces of dust generating vertical stripes difficult to be corrected by the same.

Although in the present embodiment, the three candidate reading positions $Y_1$, $Y_2$, and $Y_3$ are described as the candidate reading positions, by way of example, the number of candidate reading positions is not limited to three, but more candidate reading positions can be set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-032774 filed Feb. 23, 2015, which is hereby incorporated by reference herein in its entirety.

What is claimed is:

1. An image reading apparatus comprising:
a conveying unit configured to convey an original to a reading area on an original platen glass;
a reading unit configured to read the original at a reading position within the reading area; and
a processor configured to execute:
   a detection task that detects, using image data read at a plurality of candidate reading positions within the reading area in a state where the original is not conveyed, foreign matter adhering to the plurality of candidate reading positions;
   a first determination task that determines the number of pieces of foreign matter of first width and the number of pieces of foreign matter of a second width, the first width being not smaller than the second width; and
   a calculation task that calculates an amount of stain based on the number of pieces of foreign matter of the first width and the number of pieces of foreign matter of the second width; and
   a second determination to task that determines a reading position at which the original is to be read, out of the plurality of candidate reading positions, based on the amount of stain.

2. The image reading apparatus according to claim 1, wherein the second determination task determines a candidate reading position where the amount of stain is the smallest, as the reading position.

3. The image reading apparatus according to claim 2, wherein when a candidate reading position where the foreign matter is not detected, the second determination task determines the candidate reading position as the reading position, and terminates processing for determining the reading position.

4. The image reading apparatus according to claim 1, wherein, the first width is not smaller than a predetermined width, and the second width is smaller than the predetermined width.

5. The image reading apparatus according to claim 1, wherein the processor s further configured to execute a correction task that corrects an abnormal image generated by the foreign matter.

6. The image reading apparatus according to claim 1, wherein the reading unit is a moving original reading unit configured to read the original as the original passes the reading position.

7. The image reading apparatus according to claim 1, wherein:
the first determination task further determines the number of pieces of foreign matter of a third width that is not smaller than the first width, and
the second determination task does not determine, as reading position, the candidate reading position where the piece of foreign matter of the third width is detected.

* * * * *